(12) United States Patent
Cooke et al.

(10) Patent No.: US 8,770,863 B2
(45) Date of Patent: Jul. 8, 2014

(54) MULTI-FIBER FIBER-OPTIC CONNECTOR WITH SWITCHABLE POLARITY KEY

(75) Inventors: Terry L. Cooke, Hickory, NC (US); Christopher S. Houser, Newton, NC (US); Ronald A. Leonard, Connelly Springs, NC (US); James M. Wilson, Granite Falls, NC (US)

(73) Assignee: Corning Cable Systems LLC, Hickory, NC (US)

(*) Notice: Subject to any disclaimer, the term of this patent is extended or adjusted under 35 U.S.C. 154(b) by 176 days.

(21) Appl. No.: 13/487,734

(22) Filed: Jun. 4, 2012

(65) Prior Publication Data

US 2013/0322825 A1 Dec. 5, 2013

(51) Int. Cl.
*G02B 6/36* (2006.01)
*G02B 6/38* (2006.01)

(52) U.S. Cl.
CPC ............ *G02B 6/3831* (2013.01); *G02B 6/3851* (2013.01); *G02B 6/3895* (2013.01)
USPC .............................................. 385/78; 385/76

(58) Field of Classification Search
CPC ... G02B 6/3831; G02B 6/3851; G02B 6/3895
USPC ..................................................... 385/76–78
See application file for complete search history.

(56) References Cited

U.S. PATENT DOCUMENTS

| | | | | |
|---|---|---|---|---|
| 5,335,301 A | * | 8/1994 | Newman et al. | 385/75 |
| 5,521,997 A | * | 5/1996 | Rovenolt et al. | 385/77 |
| 6,364,537 B1 | * | 4/2002 | Maynard | 385/75 |
| 6,634,796 B2 | * | 10/2003 | de Jong et al. | 385/56 |
| 8,152,385 B2 | * | 4/2012 | de Jong et al. | 385/71 |
| 8,419,292 B2 | * | 4/2013 | Seng | 385/71 |
| 2001/0026661 A1 | * | 10/2001 | De Jong et al. | 385/56 |
| 2005/0191010 A1 | * | 9/2005 | Gurreri et al. | 385/58 |
| 2006/0140543 A1 | * | 6/2006 | Abendschein et al. | 385/55 |
| 2008/0124033 A1 | * | 5/2008 | Gurreri et al. | 385/78 |
| 2008/0260332 A1 | * | 10/2008 | Murano et al. | 385/56 |
| 2010/0220961 A1 | | 9/2010 | de Jong et al. | 385/77 |
| 2011/0064361 A1 | * | 3/2011 | Seng | 385/54 |
| 2012/0082416 A1 | * | 4/2012 | Katoh | 385/72 |
| 2012/0099822 A1 | * | 4/2012 | Kuffel et al. | 385/78 |
| 2013/0322825 A1 | * | 12/2013 | Cooke et al. | 385/59 |

* cited by examiner

*Primary Examiner* — Rhonda Peace

(57) ABSTRACT

A multi-fiber fiber optic connector is configured to include a switchable polarity key that can be used to define first and second polarity configurations for the connector. The connector has a multi-fiber ferrule surrounded by an inner housing. The inner housing has top and bottom recesses sized to accommodate the polarity key. The polarity key is removably secured in either a top or bottom recess using a latching feature. The polarity of the connector can be switched by moving the polarity key from one position in the connector to the other rather than having to disassemble the connector.

14 Claims, 12 Drawing Sheets

MULTI-FIBER FIBER-OPTIC CONNECTOR WITH SWITCHABLE POLARITY KEY

FIELD

The present disclosure relates to fiber optic connectors, and in particular to a multi-fiber fiber-optic connector having a switchable polarity key for changing the polarity of an MTP connector in the field.

BACKGROUND

Some optical fiber telecommunications systems utilize optical fiber cables that carry multiple optical fibers. Examples of such cables include trunk cables, distribution cables and drop cables. The multi-fiber cable is terminated at one end by a multi-fiber fiber-optic connector (hereinafter, "connector"), such as an MTP type of connector that is configured to mate with a multi-fiber adapter (hereinafter, "adapter"). The adapter may be connected to a fiber optic module, such as disclosed in U.S. Pat. No. 6,869,227 and U.S. Patent Publication No. 2011/0129186. Fiber optic modules have an adapter configured to receive the connector and also have a number of single-fiber adapters configured to receive single-fiber connectors of single-fiber cables called "jumpers." The fiber optic module includes a break-out section made up of a number of optical fibers that map the fiber positions at the (multi-fiber) adapter to the single-fiber adapters. The mapping or routing scheme defines the system polarity.

To assure that a given connector is mated with the adapter in the proper polarity, the connector and the adapter are configured with fixed complementary exclusion features that only allow for a single mating orientation. While this has the advantage of preventing a connection that has the wrong polarity, it also makes it difficult to change the polarity of the connection.

Presently, the only way to change (e.g., reverse) the polarity of the connector-adapter connection in the field is to disassemble the end of the connector. Unfortunately, this approach exposes the factory ribbonized fibers and the polished connector end faces to damage and or debris, thereby threating the quality of the factory termination. Under most circumstances, the connection must be retested to ensure that no fibers were broken and that the connector still performs to the factory test standards. This approach to changing the polarity works approximately 75% of the time. This means that for about 25% of the time, problems arise when trying to change the connector polarity, with the problems causing substantial delays and added expense.

SUMMARY

An aspect of the disclosure is a connector for connecting to an adapter and having a field-switchable polarity. The connector includes a ferrule configured to support multiple optical fibers. An inner housing surrounds an outside portion of the ferrule. The inner housing has a front end, a back end, and top and bottom sides with respective top and bottom surfaces. The top and bottom surfaces having formed therein respective top and bottom recesses. The inner housing also has top and bottom latching features operably arranged relative to the respective top and bottom recesses. A polarity key is configured to be removably secured within either the top recess by the top latching feature or within the bottom recess by the bottom latching feature to respectively define either a top-side keying configuration or a bottom-side polarity keying configuration.

Another aspect of the disclosure is a method of changing the polarity of a connection between a connector having first and second polarity keying configurations and an adapter having a polarity keying configuration that is complementary to both the first and second polarity keying configurations. The method includes removing a polarity key from a first removably secure position within the connector that defines the first polarity keying configuration associated with a first polarity. The method also includes arranging the polarity key in a second removably secure position within the connector that defines the second polarity keying configuration associated with a second polarity. The method then includes connecting the connector the adapter.

Another aspect of the disclosure is a connector for use with an adapter having a polarity keying configuration. The connector has a ferrule having an outer portion. The ferrule is configured to support multiple optical fibers. The connector also includes an inner housing surrounding the outer portion of the ferrule and having top and bottom recesses formed therein. The connector further includes a polarity key configured to be removably secured in either the top or bottom recess to define respective top and bottom connector polarity keying configurations that are each complementary to the adapter polarity keying configuration.

Additional features and advantages will be set forth in the Detailed Description which follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate example embodiments that together with the Detailed Description serve to explain the principles and operation of the various embodiments disclosed herein. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the polarity key aspects of the disclosure.

The claims as set forth below are incorporated into and constitute part of this Detailed Description.

The entire disclosure of any publication or patent document mentioned in this Application is incorporated by reference.

Cartesian coordinates are shown in some of the Figures for the sake of reference and are not intended to be limiting as to direction or orientation.

The disclosure relates to fiber optic connectors and adapters. An adapter is a device that receives a connector. A connector includes the structure (assembly) mounted upon the end of a multi-fiber fiber optic cable ("cable"). Such cables have a variety of names depending on their particular usage, and may be considered as "trunk cables" or "trunks" when connected to fiber optic modules used to form connections to jumper cables using a select polarity. The connectors and adapters described herein are assumed to be multi-fiber connectors and multi-fiber adapters unless stated otherwise.

As used herein, the term "optical fiber" is intended to include all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals.

The term "removably secure" and variants of this phrase with respect to the polarity key and the connector mean that the polarity key can be inserted into and removed from the connector but can also be secured in a position in the connector, i.e., in the top recess or the bottom recess, as discussed below.

Figure 1A:
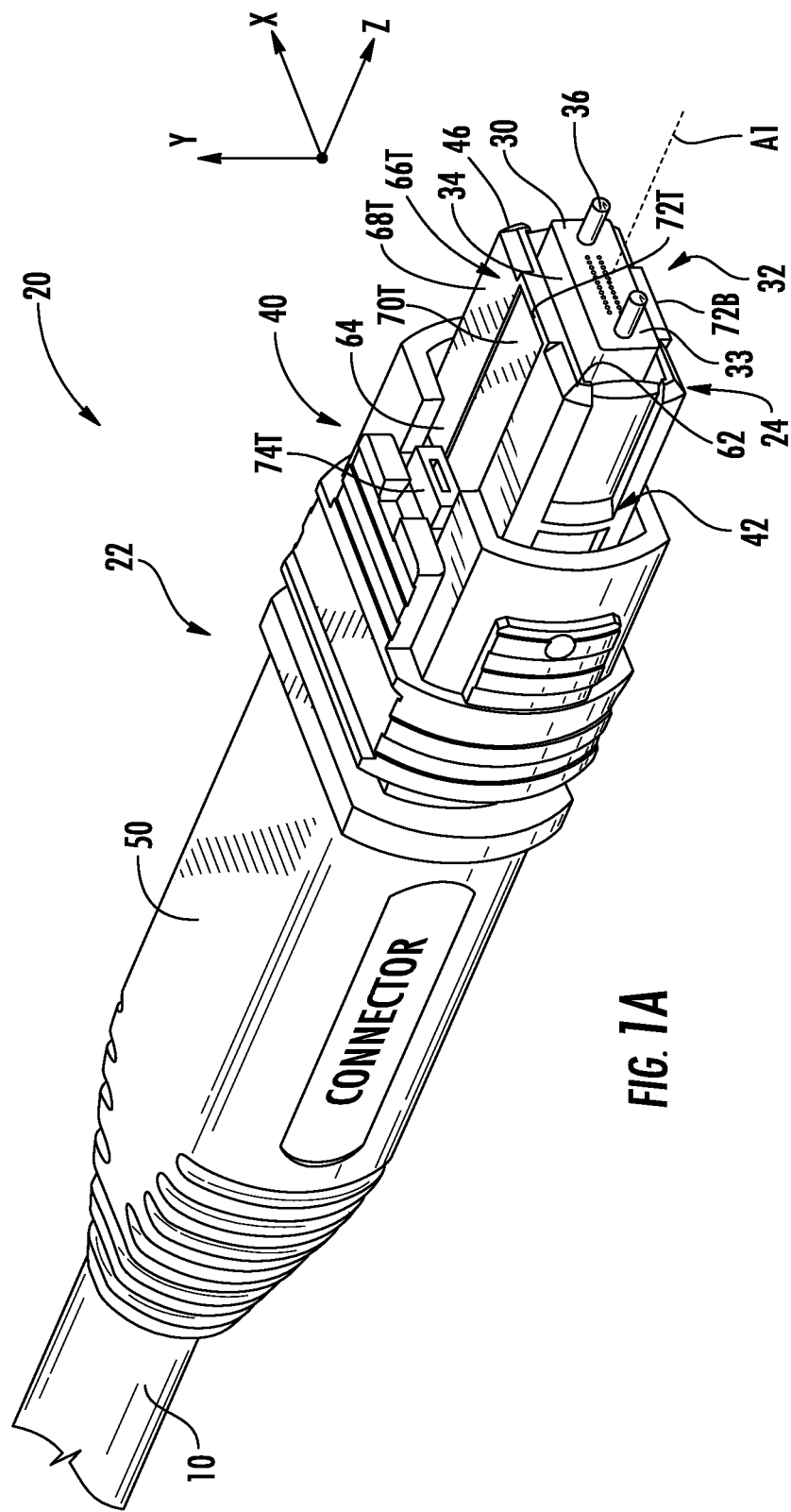
FIG. 1A is an elevated view of the top side of an example connector according to the disclosure.
Figure 1B:
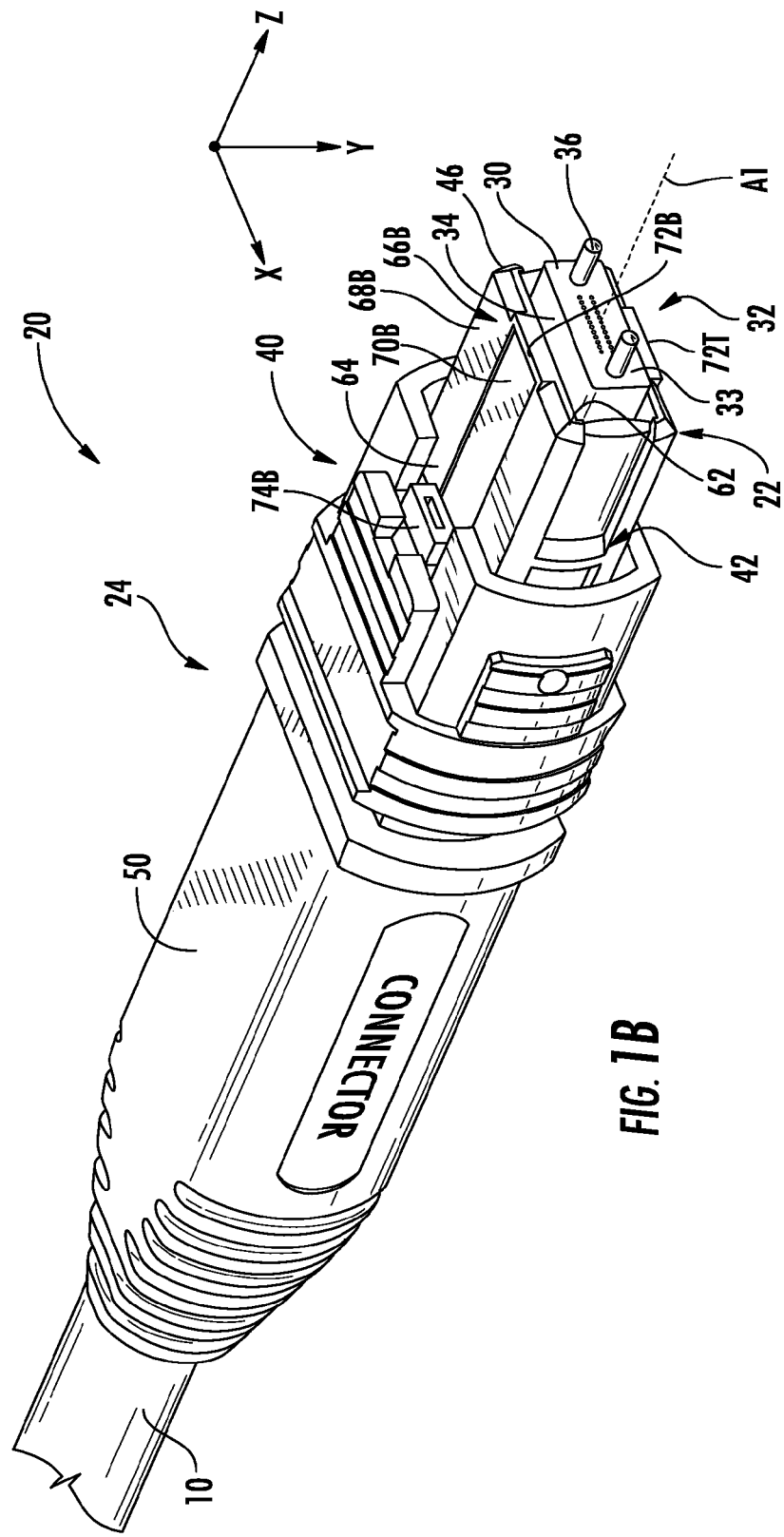
FIG. 1B is an elevated view of the bottom side of an example connector according to the disclosure as seen when the connector of FIG. 1A is rotated by 180°.

FIG. 1A is an elevated view of the top side of an example connector 20 according to the disclosure. FIG. 1B is an elevated view of the bottom side of an example connector according to the disclosure as seen when the connector of FIG. 1A is rotated by 180°. An exemplary connector 20 has an MTP configuration, which is used by way of illustration in the discussion below. Connector 20 is therefore referred to hereinafter as MTP connector 20. MTP connector 20 is shown in FIGS. 1A and 1B as well as in other Figures as being operably arranged at one end of a cable 10. The word "connector" appears on the side of connector 20 to provide an indication of the connector's relative orientation in some of the Figures. For example, in FIG. 1B the word "connector" is upside down because the view of FIG. 1B shows the connector as being upside down to show the bottom side of the connector.

The MTP connector 20 has a longitudinal connector axis A1, a top side 22 and a bottom side 24. MTP connector 20 includes a multi-fiber ferrule ("ferrule") 30 having a front end 32 and an outside portion 34. Front end 32 defines an end-face 33 that in an example is generally planar. Ferrule 30 is maintained within a connector housing 40 having an open front end 42. The connector housing 40 supports, in an open front end 42, an inner housing 46 positioned about ferrule 30 around the ferrule outside portion 34. A strain-relief boot portion 50 at the back end of connector housing 40 flexibly engages cable 10. In the example shown, ferrule 30 and inner housing 46 define the MTP configuration for connector 20.

Figure 1C:
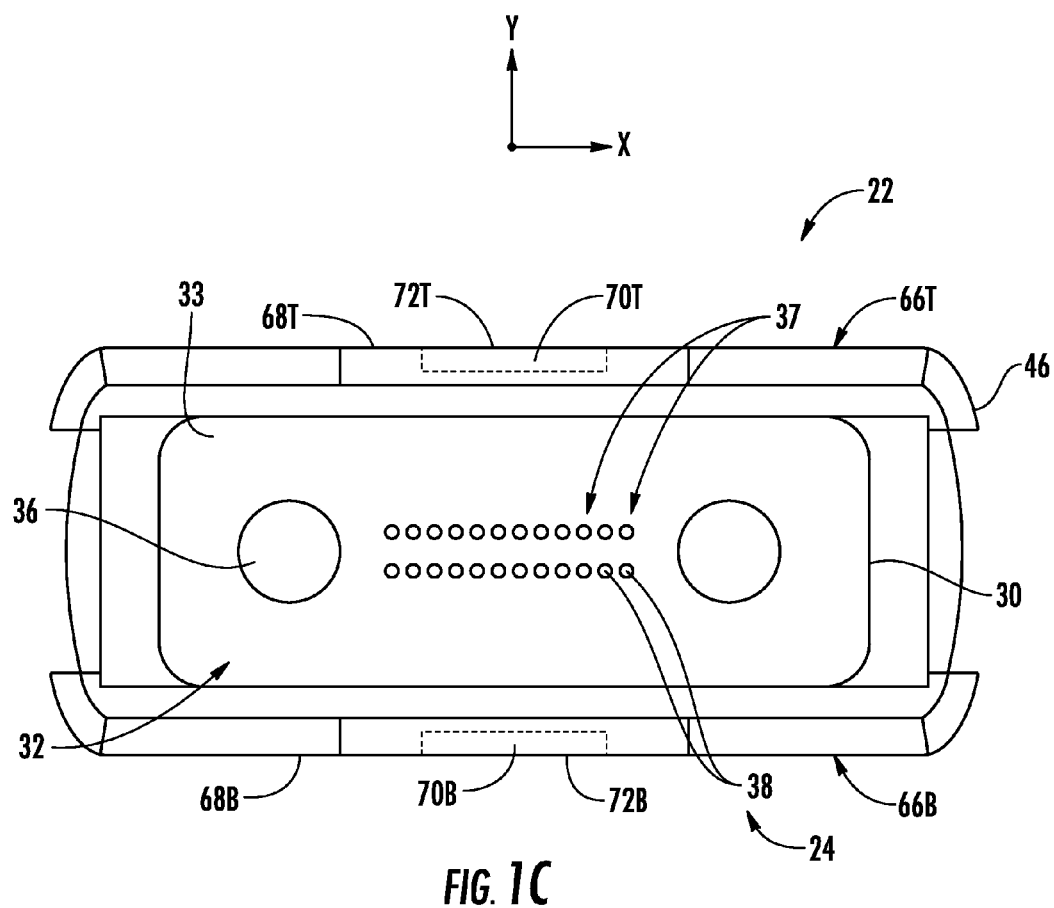
FIG. 1C is a face-on view of the ferrule and inner housing of the connector of FIGS. 1A and 1B.

With reference also to FIG. 1C, ferrule 30 includes guide pins 36 that extend from end-face 33 of the ferrule front end 32. Guide pins 36 are located on either side of an array of axially extending fiber bores 37 that are open at end face 33. Fiber bores 37 are each configured to support an optical fiber 38. The MTP connector 20 may further include additional internal components that are not shown, such as a biasing spring, an alignment cuff, a ferrule boot, etc., which are not critical in understanding or implementing the disclosure.

An example MTP connector 20 contains various numbers of optical fibers 38 operably supported by ferrule 30 in a corresponding number of fiber bores 37. Example numbers of optical fibers 38 supported by ferrule 30 include 12, 24, 36, 48, 60 and 72. The configuration of ferrule 30 allows for the use of ribbonized fiber to achieve very high density. TIA/EIA-604-5, Fiber Optic Intermateability Standard, Type MPO (FOCIS 5) describes the dimensions and tolerances required for intermateability between manufacturers' components. The MTP end face 33 is aligned with a mating adapter (introduced and discussed below) using guide pins 36, wherein the mating adapter has corresponding guide holes.

With continuing reference to FIGS. 1A and 1B, inner housing 46 includes a front end 62, a back end 64, a top side 66T with a top surface 68T, and a bottom side 66B with a bottom surface 68B. Top surface 68T has a top recess 70T formed therein and that extends in the direction of the connector axis A1. Likewise, bottom surface 68B has a bottom recess 70B formed therein and that also extends in the direction of the connector axis A1. Top and bottom recesses 70T and 70B are defined in part by respective top and bottom lips 72T and 72B at front end 62, and respective top and bottom latching features 74T and 74B at back end 64. Latching features 74T and 74B can more generally be operably arranged relative to top and bottom recesses 70T and 70B, with back end 64 being a particularly useful location. Example latching features 74T and 74B and their operation are discussed in detail below. In an example, top and bottom recesses 70T and 70B are central recesses, i.e., each is generally aligned with connector axis A2 in the Y-direction, i.e., generally above and below the central axis. In other embodiments, top and bottom recesses 70T and 70B are laterally offset in the X-direction relative to a center line in the Y-direction that passes through connector axis A2.

Figure 2:
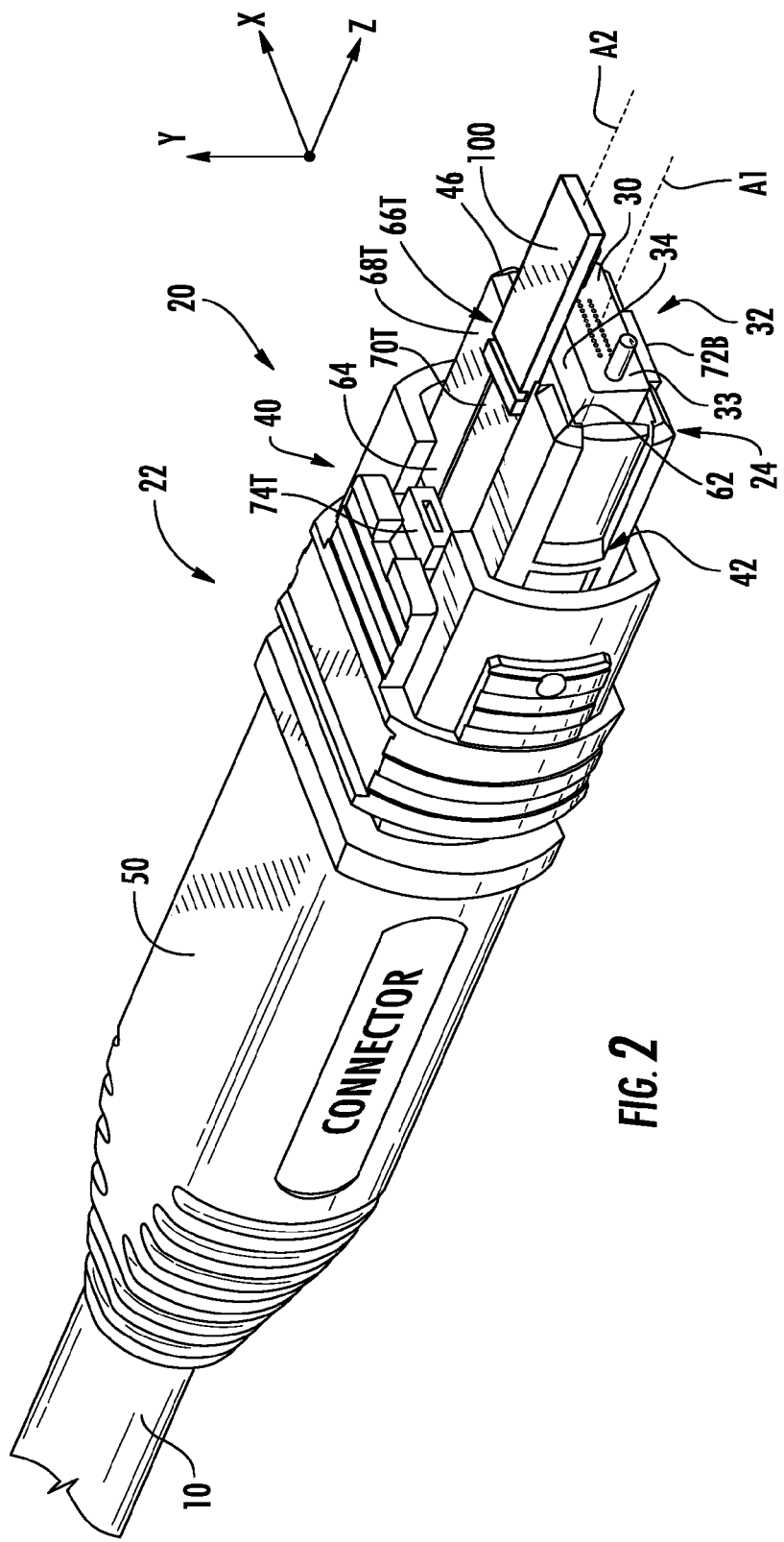
FIG. 2 is similar to FIG. 1A, and also shows a polarity key in the process of being inserted into a top recess of the inner housing.
Figure 3A:
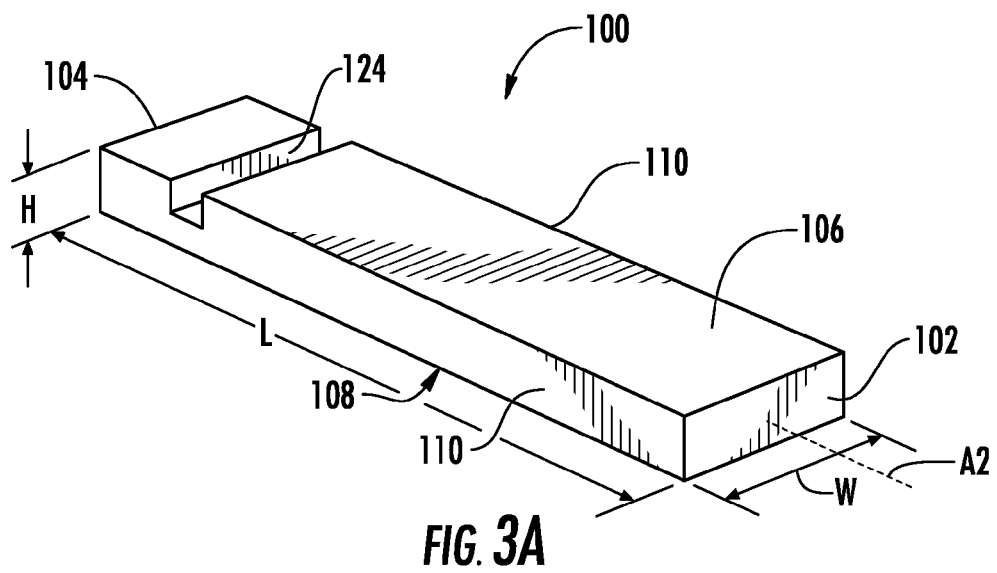
FIGS. 3A through 3C are close-up elevated views of example embodiments of a polarity key.

FIG. 2 is similar to FIG. 1A, and also shows the top side 22 of connector 20 with a polarity key 100 in the process of being inserted into top recess 70T. FIG. 3A is a close-up, elevated view of an example polarity key 100. Polarity key 100 is referred to as being field adjustable, meaning that a field technician can adjust the position of the polarity to be in one of two different locations within connector 20 to define two different keying configurations, as described below.

To this end, top and bottom recesses 70T and 70B are configured to receive polarity key 100. An exemplary polarity key 100 is generally rectangular in shape (i.e., in the vernacular of geometry, is a rectangular cuboid) and has a longitudinal polarity key axis A2. Polarity key 100 has a front end 102, a back end 104, a top side 106, a bottom side 108, and edges 110. Polarity key 100 has a length L, a width W and a height H. An example width W=7.8 mm. The length L and height H can be any reasonable values that allow polarity key 100 to serve its keying function. Length L is determined by the length of top and bottom recesses 70T and 70B. An example material for polarity key 100 is plastic.

Figure 3B:
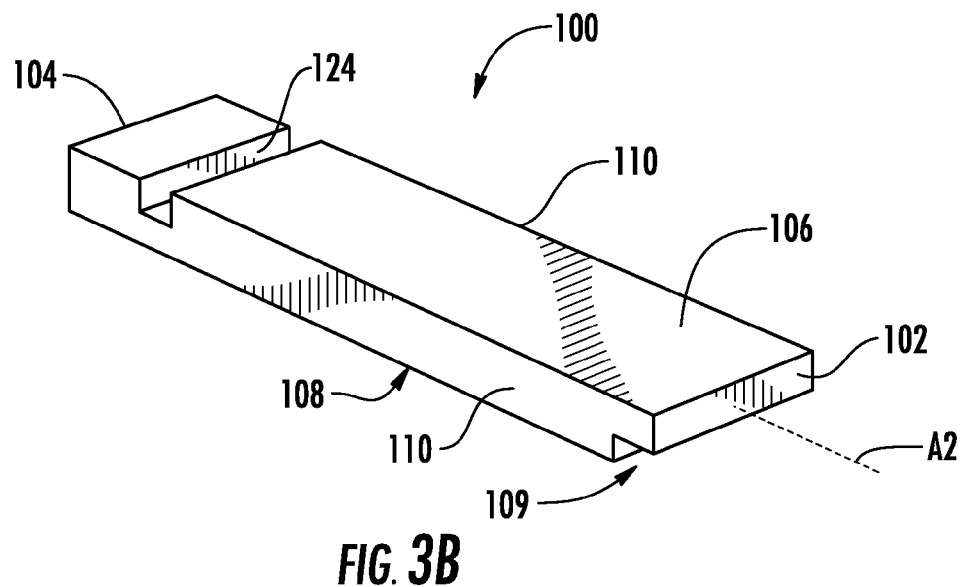
Figure 3C:
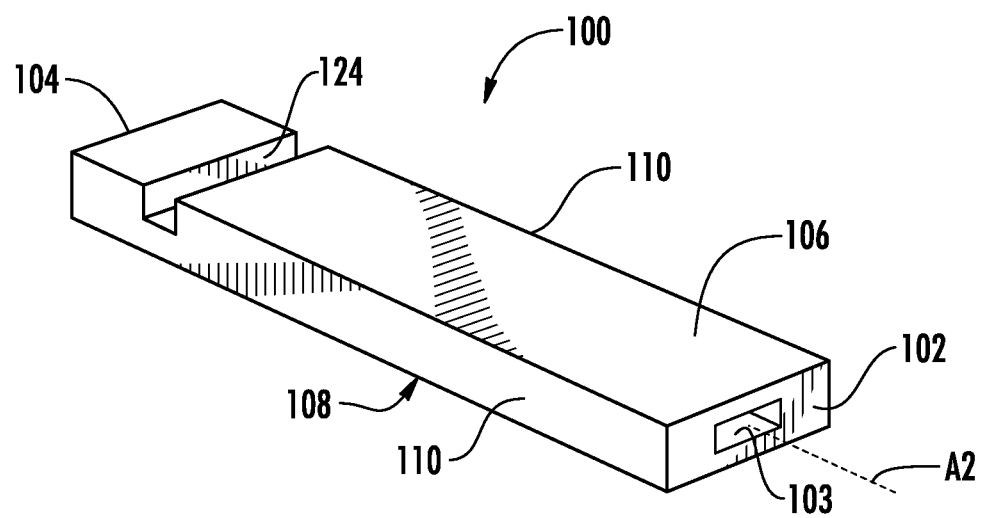

Polarity key 100 is configured to be removably secured within top recess 70T or bottom recess 70B. An example polarity key 100 includes a securing feature 124 configured to be engaged by either top latching feature 74T or bottom latching feature 74B, depending on whether the polarity key resides in top or bottom recess 70T or 70B. In an example best seen in FIG. 3, one type of securing feature 124 is in the form of a slot formed in top side 106 near back end 104 and that runs from one edge 110 to the other. Other securing features 124 are also possible and are defined by the type of latching features used.

In an example embodiment, polarity key 100 includes at front end 102 a notch 103 configured to receive a polarity key-removal tool (not shown) to facilitate removing polarity key 100 from connector 20, as described below. In another example embodiment illustrated in FIG. 3B, polarity key 100 includes a recess 109 at front end 102 on bottom side 108 and configured to engage top or bottom lip 72T or 72B when the polarity key is properly positioned in top or bottom recess 70T or 70B.

Figure 4:
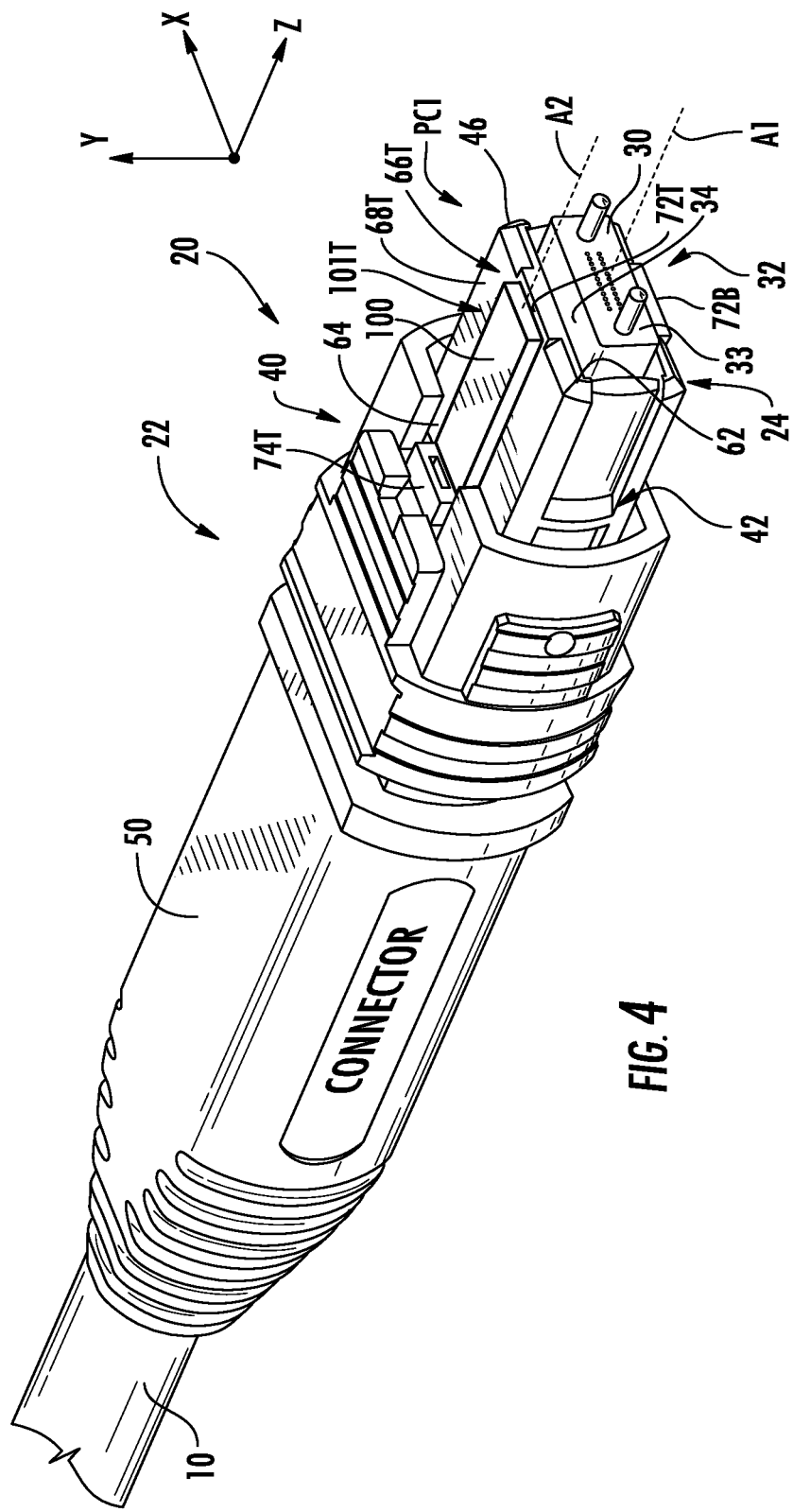
FIG. 4 is similar to FIG. 2 and shows the polarity key operably arranged and removably secured in the connector in the top slot of the inner housing.

FIG. 4 is similar to FIG. 2 and shows polarity key 100 operably arranged and removably secured in MTP connector 20 in top slot 70T. This is accomplished by placing polarity key 100 generally within top recess 70T, with the securing feature 124 facing upward. Polarity key 100 is then urged rearward so that the polarity key fits within top recess 70T while securing feature 124 is engaged by latching feature 74, thereby removably securing the polarity key within top recess 70T. In the example of polarity key 100 of FIG. 3C that includes recess 109, the recess engages lip 72T.

Figure 5A:
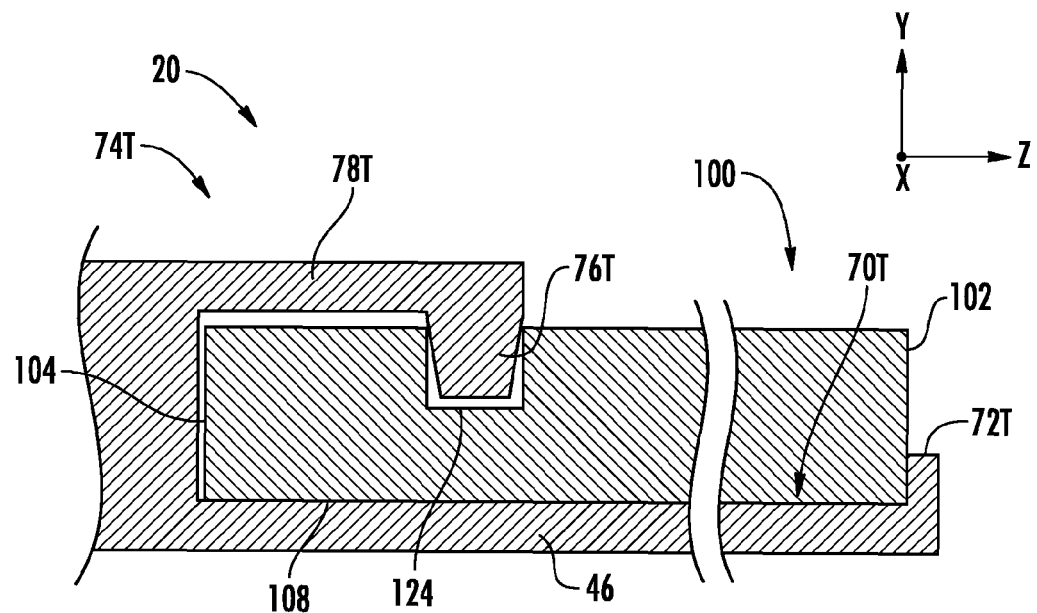
FIGS. 5A and 5B are close-up cross-sectional views of an example latching feature used to removably secure the polarity key to the connector, with FIG. 5A showing the latched position and FIG. 5B showing the unlatched position.
Figure 5B:
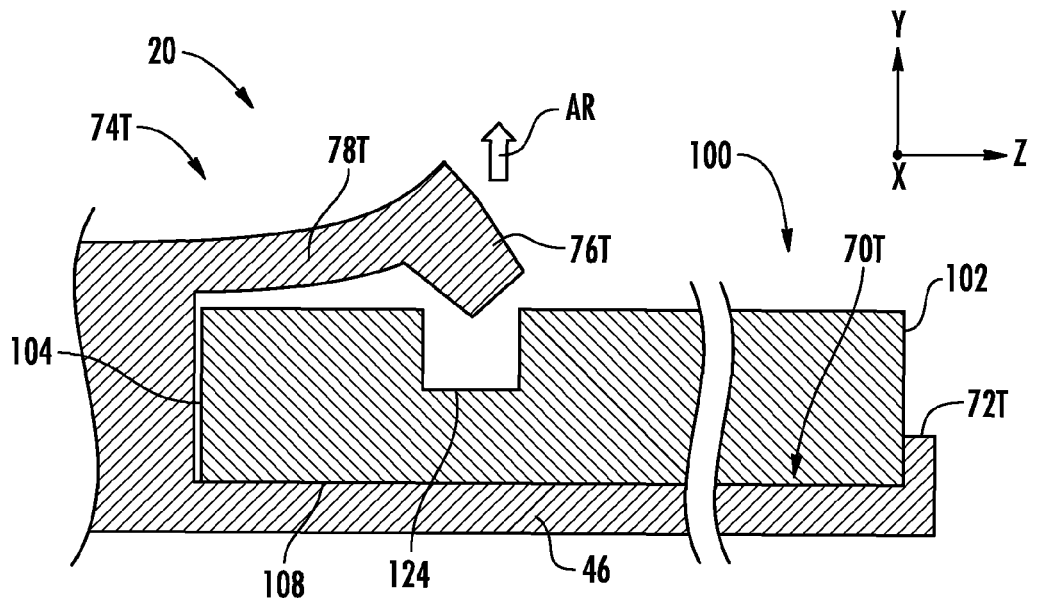

FIGS. 5A and 5B are close-up cross-sectional views of an example latching feature 74T formed as part of inner housing 46, showing the latching feature in the latched position (FIG. 5A) and unlatched position (FIG. 5B). Latching feature 74T includes a catch 76T that downwardly depends from a release member 78T. In an example, catch 76T is biased so that it easily clicks into and out of securing feature 124, which is shown in the form of a slot. When polarity key 100 is so arranged, the polarity key, along with the top surface 68T of inner housing 46, defines a top-side polarity keying feature 101T in the top side 66T of the inner housing.

In an example, polarity key 100 is removed from top recess 70T by engaging release member 78T with a finger and pushing it upwards (i.e., away from inner housing 40, as indicated by arrow AR in FIG. 5B) so that catch 76T disengages securing feature 124. Once polarity key 100 is loose, it can be lifted out of top recess 70T. Alternatively or in addition thereto, the aforementioned polarity key removal tool is used to engage notch 103 to assist in removing polarity key 100 from recess 70T.

This same general procedure is carried out when inserting and removing polarity key 100 from bottom slot 70B on bottom side 24 of MTP connector 20. Polarity key 100 in bottom recess 70B defines, along with bottom surface 68B of inner housing 46, a bottom side polarity keying feature 101B.

Figure 6:
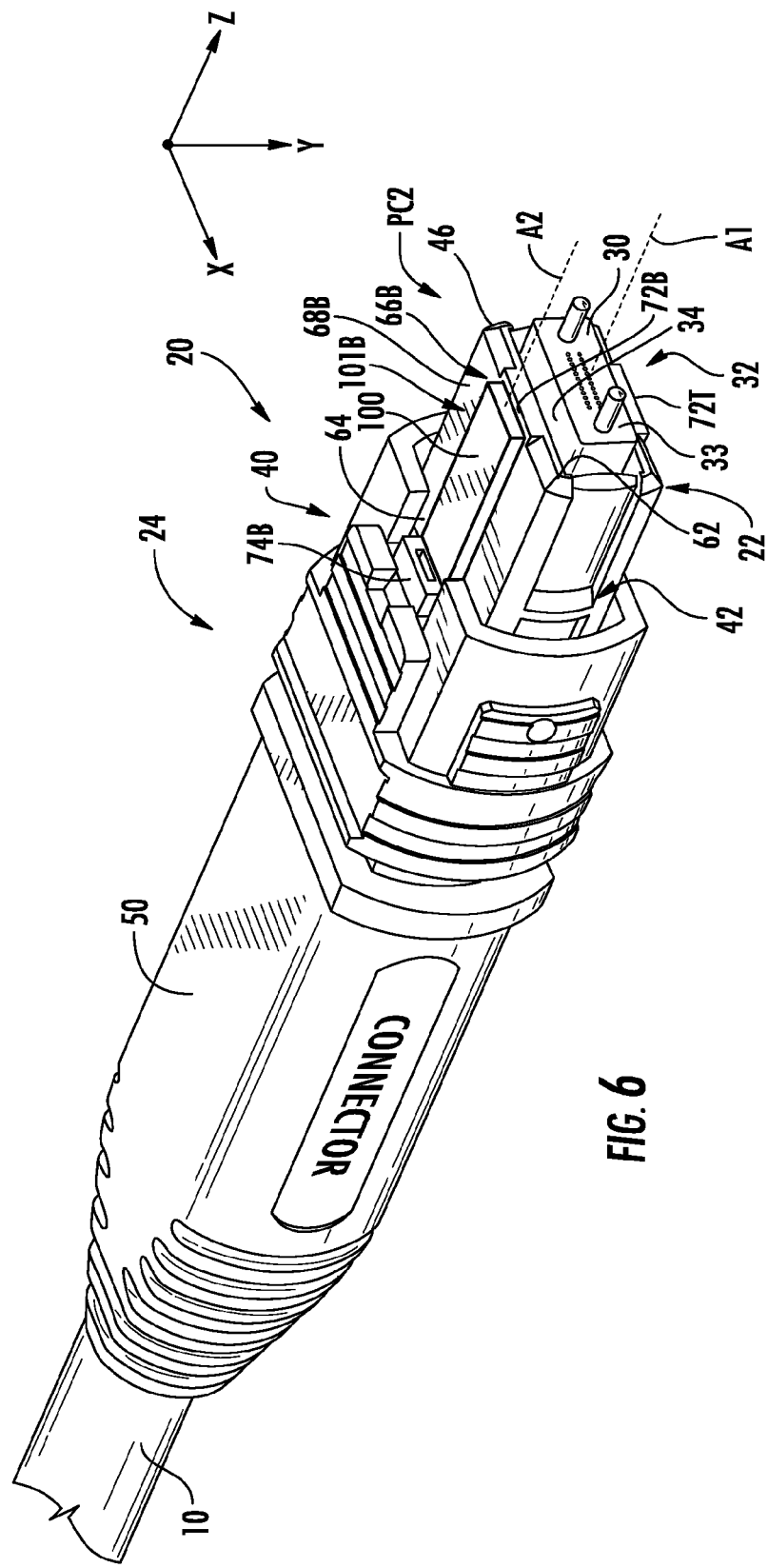
FIG. 6 is similar to FIG. 1B and FIG. 4, and shows the polarity key operably disposed in the bottom slot of the inner housing.

FIG. 6 is similar to FIG. 4 and shows polarity key 100 operably disposed in bottom slot 70B. In an example, top and bottom recesses 70T and 70B and the corresponding top and bottom latching features 74T and 74B are configured so that polarity key 100 can be snap-inserted and snap-removed from either of the recesses.

Thus, with reference to FIGS. 4 and 6, MTP connector 20 includes first and second polarity keying configurations, depending in which recess polarity key 100 resides: 1) a top-side polarity keying configuration PC1 associated with top-side polarity keying feature 101T, which is defined when polarity key 100 is secured in top recess 70T (FIGS. 4); and 2) a bottom-side polarity keying configuration PC2 associated with bottom-side polarity keying feature 101B, which is defined when polarity key 100 is secured in bottom recess 70B (FIG. 5). Moving polarity key 100 between the top and bottom locations in MTP connector 20 serves to change the polarity of the MTP connector.

In an example, polarity key 100 initially resides in MTP connector 20. For example, polarity key 100 is installed in the MTP connector 20 in the factory where the MTP connector is made rather than accompanying the MTP connector as a loose item. In an example, polarity key 100 is removed from or has its position switched between the top and bottom slots 70T and 70B only when a field technician finds it necessary to do so. For example, a field technician may decide it is necessary to switch the position of polarity key 100 to the opposite side of the MTP connector to change the connector polarity (e.g., reverse the polarity).

Figure 7A:
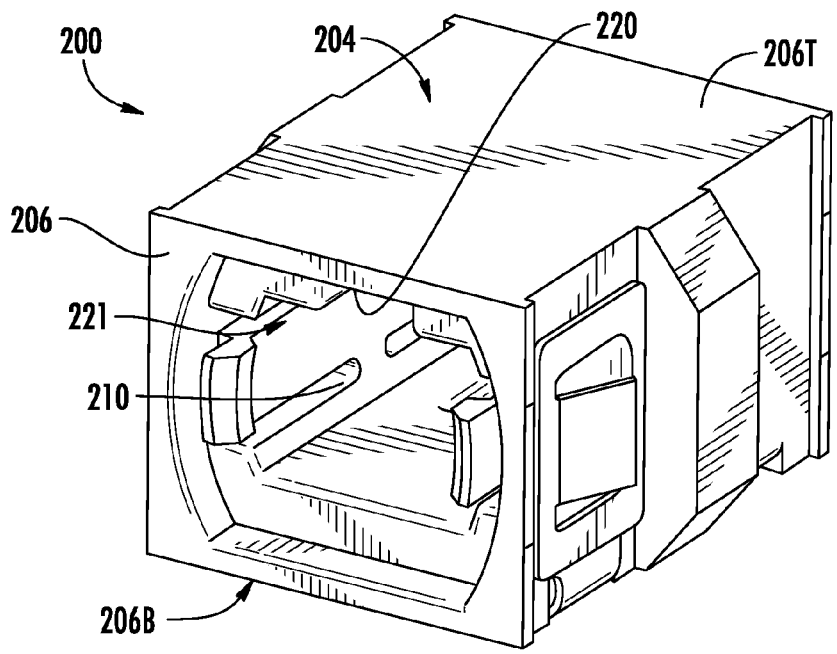
FIGS. 7A and 7B are top and bottom views of an example adapter configured to matingly engage the connector.
Figure 7B:
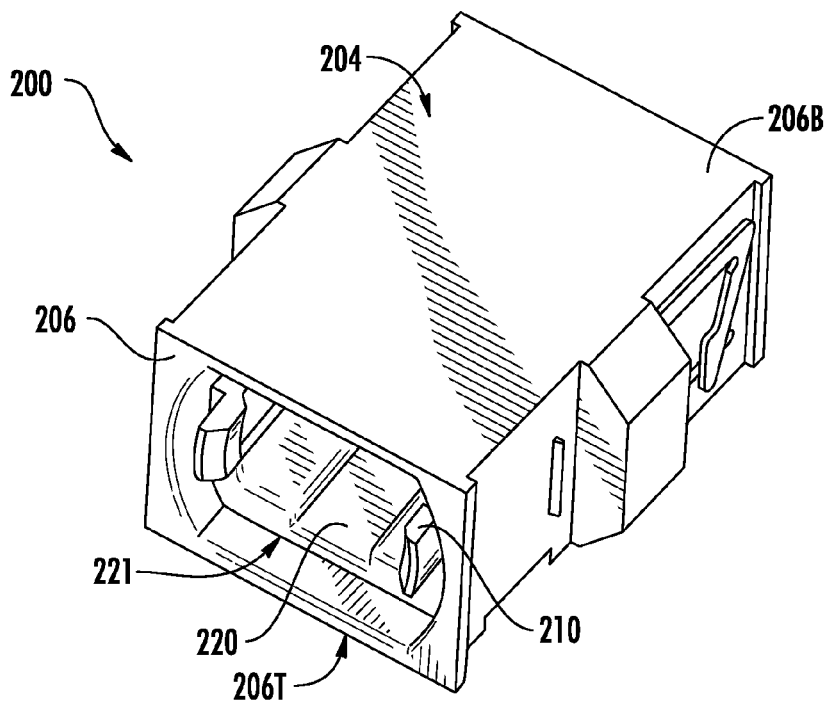

FIGS. 7A and 7B are top-down and bottom-up views of an example adapter 200 configured to matingly engage MTP connector 20. Adapter 200 includes a housing 204 having a front end 206 that defines an aperture 210 that is generally complimentary to MTP connector 20. Housing 204 also has a top side 206T and a bottom side 206B. Aperture 210 includes a recess 220 adjacent top side 206T. Recess 220 defines a polarity keying feature 221 that is complimentary to each of the top-side and bottom-side polarity keying configurations PC1 and PC2. However, in general, only one of the polarity keying configurations of connector 20 will be the correct polarity for use with adapter 200.

Because MTP connector 20 has a switchable polarity keying configuration by virtue of field-switchable polarity key 100, a field technician can manage the polarity of the connection between the MTP connector and adapter 200 without the complications and risks associated with having to dissemble and then assemble the MTP connector. Normally, if a prior art MTP connector is dissembled and then re-assembled to reverse the polarity of the connection, the MTP connector must be retested to ensure it meets system and factory performance standards. Damage to ferrule end face 33 or optical fibers 38 are usually not easily fixed in the field. This means that the system operation will be disrupted and the needed repairs will give rise to added expense. Also, the ability to adjust the polarity of MTP connector 20 allows for an extra section of trunk, harness or jumper cable to be added if needed to establish the connection. Allowing the polarity of MTP connector 20 to be managed in the field by adjusting polarity key 100 as described above provides a field technician with greater latitude to solve polarity-related installation and maintenance issues.

Figure 8A:
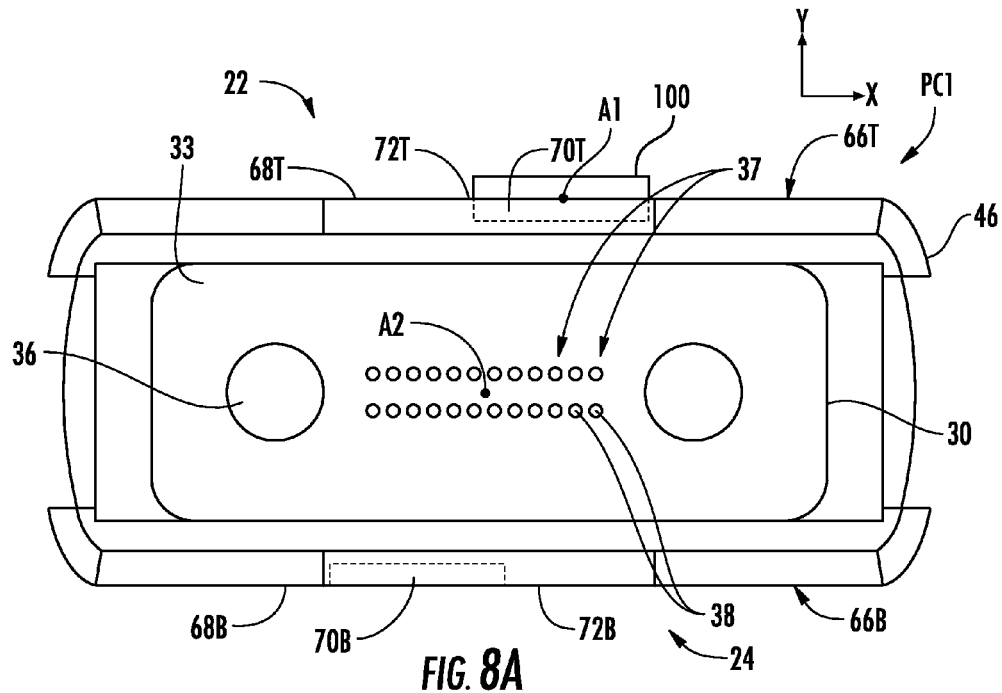
FIGS. 8A and 8B are a face-on views of an example connector showing just the ferrule and inner housing, with the connector configured with two offset polarity configurations.
Figure 8B:
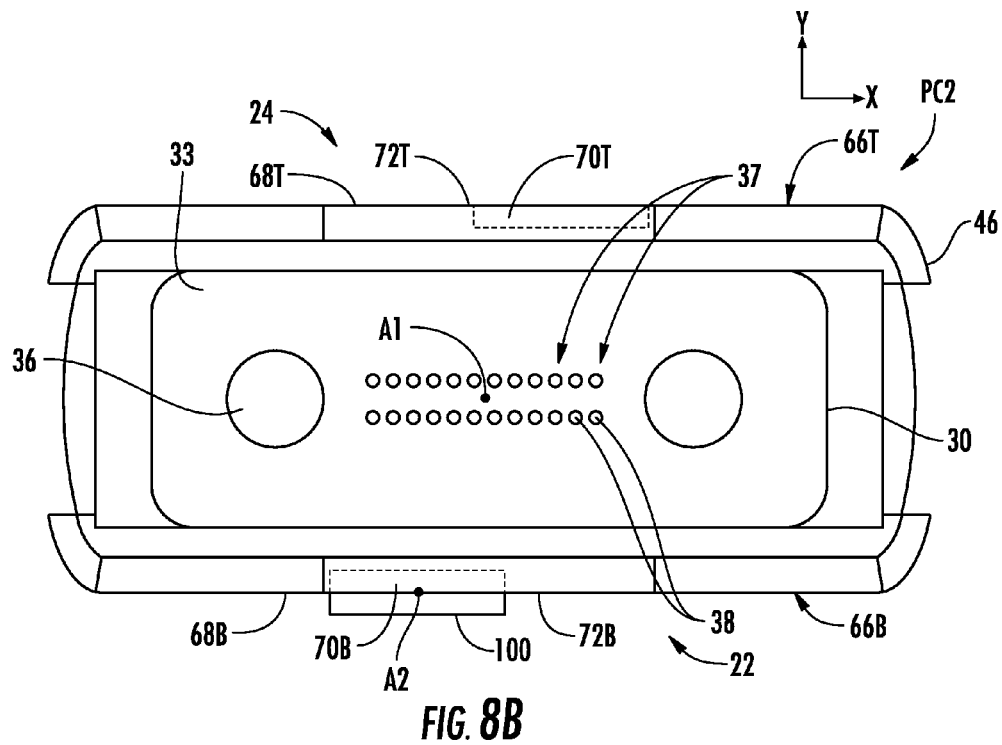

In an example embodiment illustrated in FIGS. 8A and 8B, connector 20 is configured such that axis A2 of polarity key 100 is laterally offset in the X-direction relative to axis A1 of the connector for both the top-side and bottom-side keying configurations. Such keying configurations are useful in high-security networks where only a certain type of optical fiber link is allowed, i.e., one link to one trunk.

In another example embodiment, polarity keys 100 can have a select color that is associated with a select polarity. This allows for an end-user to quickly identify the polarity of MTP connector 20. In an example, the color code is defined for the polarity key 100 being the top-side position in MTP connector 20.

The ability to effectively reverse polarity of an optical fiber cable in the field without the risk of damaging the optical fibers or the factory polished connector end-faces offers many commercial advantages. Trunks, harnesses, jumpers and like cables are typically ordered pre-terminated at various lengths for final installation purposes. When lengths are calculated incorrectly, extender trunks are typically used to achieve the desired length requirements. Extender trunks typically have a different polarity than the main trunk. Thus, the MTP connector 20 disclosed herein allows a field technician to use standard cables as extenders without having to back order or expedite another cable or connector from the factory.

Figure 9A:
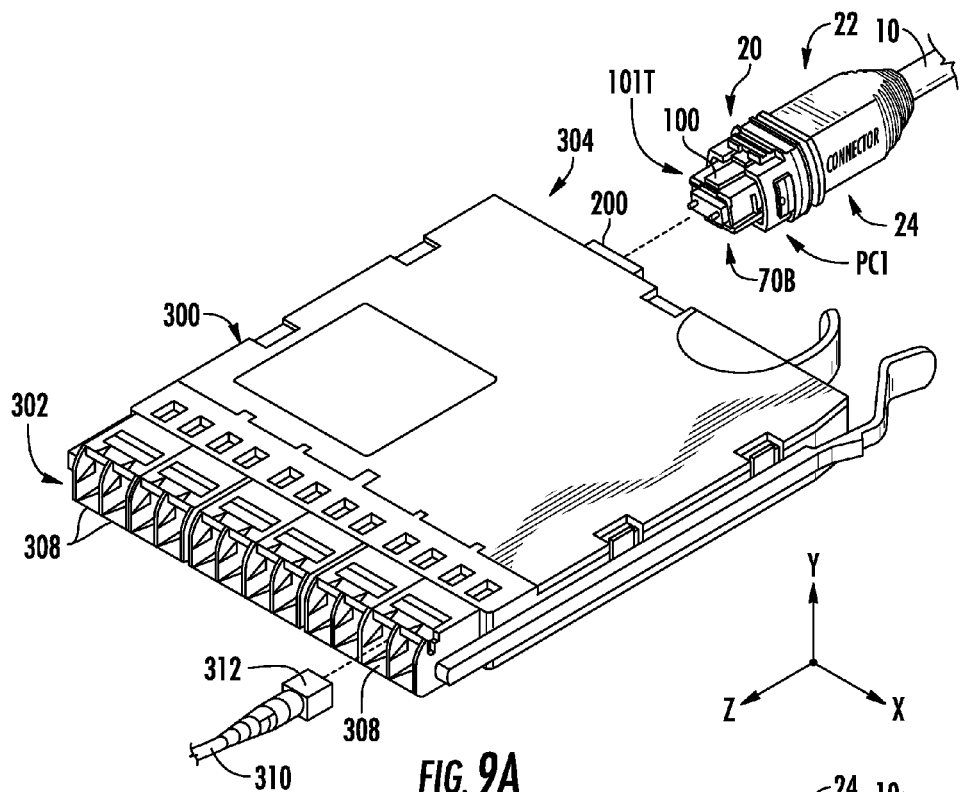
FIGS. 9A and 9B are elevated views of an example fiber-optic module and the connector disclosed herein as arranged in a first polarity configuration PC1 (FIG. 9A) and in a second polarity configuration (FIG. 9B), wherein the switch between polarity configurations is accomplished by switching positions of the polarity key.
Figure 9B:
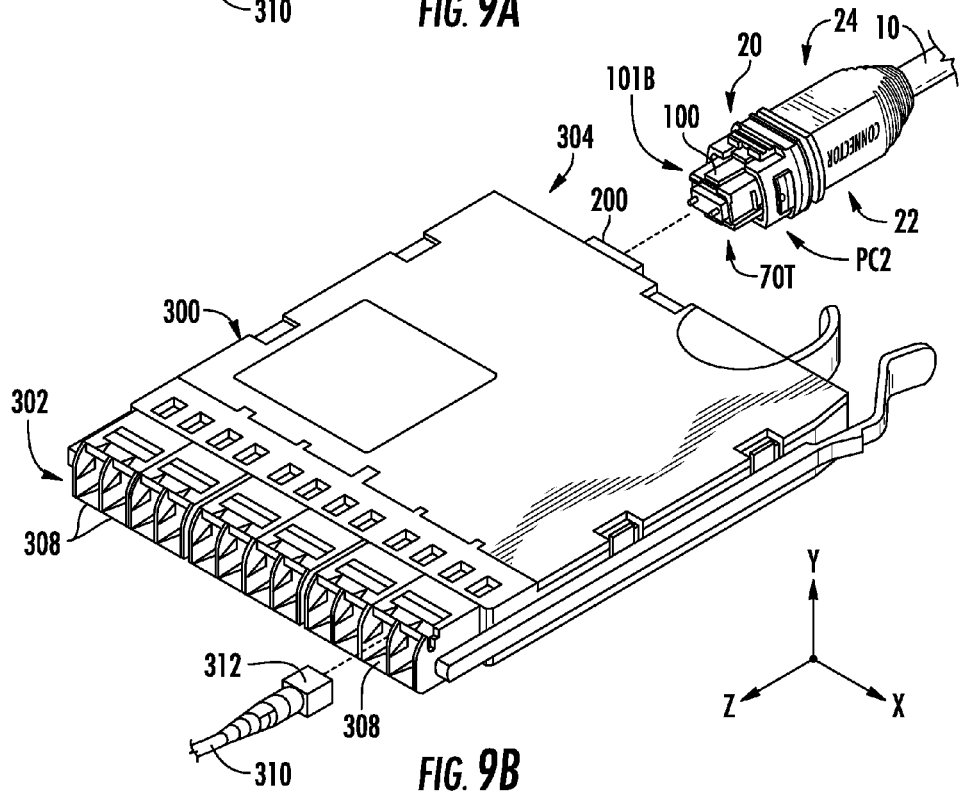

Polarity key 100 allows for polarity management to be carried out during final installation of the particular optical telecommunications system. In particular, it allows an end-user to manage polarity at the harness level, instead of at the adapter level. FIGS. 9A and 9B are elevated views of an example fiber-optic module 300 and connector 20 in the first polarity configuration PC1 (FIG. 9A) and the second polarity configuration (FIG. 9B). Fiber-optic module 300 has front and back ends 302 and 304, with the front end having a plurality of single-fiber adapters 308 and the back end having adapter 200. The front-end single-fiber adapters 308 are configured to receive jumper connectors 312 of jumper cables 310. The combination of the fiber-optic module 300, jumpers 310 (with jumper connectors 312) and cable 10 (with MTP connector 20) constitutes a fiber-optic module assembly.

As discussed above, fiber-optic module 300 includes a harness (not shown) that establishes a select connection configuration between adapter 200 and the single-fiber adapters 310 for receiving jumper connectors 312. This requires a select polarity for connector 20. If for some reason cable 10 is connectorized with connector 20 having the wrong polarity (say, polarity configuration PC1 in FIG. 9A), then the polarity of connector 10 can be easily switched (say, to polarity configuration PC2 in FIG. 9B) by switching the positions of polarity key 100 in the manner described above. In FIG. 9B, polarity key 100 moved from the top recess 70T to the bottom recess 70B and MTP connector 20 is flipped over (i.e., rotated by 180°) so that the polarity configuration PC2 is properly oriented to mate with adapter 200 of fiber-optic module 300.

The ability to switch polarity using polarity key 100 as disclosed herein is advantageous because adapters are difficult to access to add or remove polarity key-blocking features. And, as discussed above, connectors 20 are generally difficult to disassemble and then re-assemble without damaging the connector components, including the optical fibers supported therein. MTP connector 20 as disclosed herein allows a field technician to manage polarity at the MTP connector without the need to switch adapters in an occupied facility. In an example, MTP connector 20 is made to be backwards compatible with currently deployed systems. This obviates the need to purchase new adapter panels to manage polarity in currently deployed systems.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A multi-fiber fiber optic connector ("connector") for connecting to a multi-fiber adapter ("adapter") and having a field-switchable polarity, comprising:
   a ferrule configured to support multiple optical fibers;
   an inner housing surrounding an outside portion of the ferrule, the inner housing having a front end, a back end, and top and bottom sides with respective top and bottom surfaces, the top and bottom surfaces having formed therein respective top and bottom recesses, the top and bottom recesses being laterally offset relative to a vertical centerline that passes through a central axis of the connector, the inner housing further having top and bottom latching features operably arranged relative to the respective top and bottom recesses; and
   a polarity key configured to be removably secured within either the top recess by the top latching feature or within the bottom recess by the bottom latching feature to respectively define either a top-side keying configuration or a bottom-side polarity keying configuration.

2. The connector of claim 1, wherein the ferrule and inner housing define an MTP connector configuration.

3. The connector of claim 1, wherein the polarity key has a generally rectangular shape.

4. The connector of claim 1, wherein the polarity key includes a slot that is engaged by the top or bottom latching features when the polarity key is in the top or bottom recess, respectively.

5. The connector of claim 1, further comprising the adapter operably engaged with the connector, with the connector having either the top-side polarity keying configuration or the bottom-side polarity keying configuration.

6. The connector of claim 1, wherein the top and bottom recesses are generally centered above and below a central axis of the connector.

7. The connector of claim 1, wherein the polarity key is color-coded to indicate a select polarity.

8. The connector of claim 1, wherein the ferrule supports either 12, 24, 36, 48, 60 or 72 optical fibers.

9. A method of switching the polarity of a connection between a multi-fiber fiber optic connector ("connector") having first and second polarity keying configurations and a multi-fiber adapter ("adapter") having a polarity keying configuration that is complementary to both first and second polarity keying configurations of the connector, the method comprising:
   removing a polarity key from a first removably secure position within the connector that defines the first polarity keying configuration associated with a first polarity;
   arranging the polarity key in a second removably secure position within the connector that defines the second polarity keying configuration associated with a second polarity, wherein the polarity key has an offset position relative to a connector axis in each of the first and second polarity keying configurations; and
   connecting the connector to the adapter.

10. The method of claim 9, further comprising the first and second polarities being reverse polarities.

11. The method of claim 9, wherein the adapter is operably connected to a fiber optic module having a select polarity configuration.

12. The method of claim 9, wherein the polarity key is color-coded to correspond to a select polarity.

13. The method of claim 9, wherein the connector has an MTP configuration.

14. The method of claim 9, wherein the polarity key snap-fits into the top and bottom recesses formed in an inner housing that surrounds an outer portion of a multi-fiber ferrule to respectively define the top and bottom polarity keying configurations.

* * * * *